United States Patent
Messinger

(12)
(10) Patent No.: US 6,732,982 B1
(45) Date of Patent: May 11, 2004

(54) LATERALLY ADJUSTABLE CLAMP

(75) Inventor: Stanley Messinger, Hurst, TX (US)

(73) Assignee: Bell Helicopter Textron, Inc., Hurst, TX (US)

( * ) Notice: Subject to any disclaimer, the term of this patent is extended or adjusted under 35 U.S.C. 154(b) by 0 days.

(21) Appl. No.: 10/410,797

(22) Filed: Apr. 9, 2003

(51) Int. Cl.[7] ................................................. F16L 3/12
(52) U.S. Cl. ........................ 248/74.1; 248/49; 24/16 PB
(58) Field of Search ........................... 248/74.1, 49, 55, 248/65, 70, 73, 74.4, 74.5; 24/20 R, 16 PB; 174/92

(56) References Cited

U.S. PATENT DOCUMENTS

| | | | |
|---|---|---|---|
| 2,250,280 A | | 7/1941 | Starbird ........................ 173/324 |
| 2,338,659 A | * | 1/1944 | Morehouse ................. 248/74.3 |
| 2,397,279 A | * | 3/1946 | Le Vesconte ............... 248/74.3 |
| 2,421,443 A | * | 6/1947 | Torresen ..................... 248/74.3 |
| 2,455,598 A | * | 12/1948 | Michalenko ............... 248/74.3 |
| 2,632,217 A | * | 3/1953 | Flora .......................... 24/16 PB |
| 2,936,982 A | | 5/1960 | Cushenberry ................. 248/74 |
| 3,041,025 A | * | 6/1962 | Daly ........................... 248/74.3 |
| 3,376,004 A | * | 4/1968 | Goldman .................... 248/74.3 |
| 3,552,696 A | | 1/1971 | Orenick ......................... 248/68 |
| 3,815,855 A | | 6/1974 | Appleton ...................... 248/74 |
| 4,441,677 A | | 4/1984 | Byerly .......................... 248/74 |
| 4,535,960 A | | 8/1985 | Downing ...................... 248/74 |
| 4,570,303 A | * | 2/1986 | Richmond et al. ........ 24/16 PB |
| 4,655,072 A | * | 4/1987 | Miyoshi ....................... 24/335 |
| 4,844,379 A | * | 7/1989 | Umehara .................... 248/74.3 |
| 4,973,259 A | | 11/1990 | Sachs .......................... 439/98 |
| 5,220,710 A | | 6/1993 | Laundan ....................... 24/279 |
| 5,377,940 A | * | 1/1995 | Cabe et al. ................. 248/74.3 |
| 5,384,936 A | | 1/1995 | Van Walraven .............. 24/279 |
| 5,538,215 A | * | 7/1996 | Hosey ...................... 248/286.1 |
| 5,784,764 A | | 7/1998 | Djordjevic .................... 24/279 |
| 5,897,087 A | * | 4/1999 | Farley .................... 248/229.21 |
| 6,508,442 B1 | * | 1/2003 | Dolez ........................ 248/74.1 |

FOREIGN PATENT DOCUMENTS

| | | | |
|---|---|---|---|
| CH | 0662631 | * | 10/1987 |
| FR | 2640349 | * | 6/1990 |
| GB | 0597259 | * | 1/1948 |
| GB | 0759179 | * | 10/1956 |
| GB | 0815606 | * | 7/1959 |

* cited by examiner

*Primary Examiner*—Anita King
(74) *Attorney, Agent, or Firm*—Pillsbury Winthrop LLP

(57) ABSTRACT

A clamp that is laterally positionable with respect to a fastener includes a clamp body including a pair of opposable legs. Each of the legs includes an elongated hole adapted to movably engage the fastener. One of the legs includes a locking surface. A locking washer is engageable with the locking surface of the clamp body leg. The locking washer includes a hole that is adapted to fixedly engage the fastener. When engaged with the fastener, the locking washer fixes the lateral position of the clamp body with respect to the fastener.

30 Claims, 2 Drawing Sheets

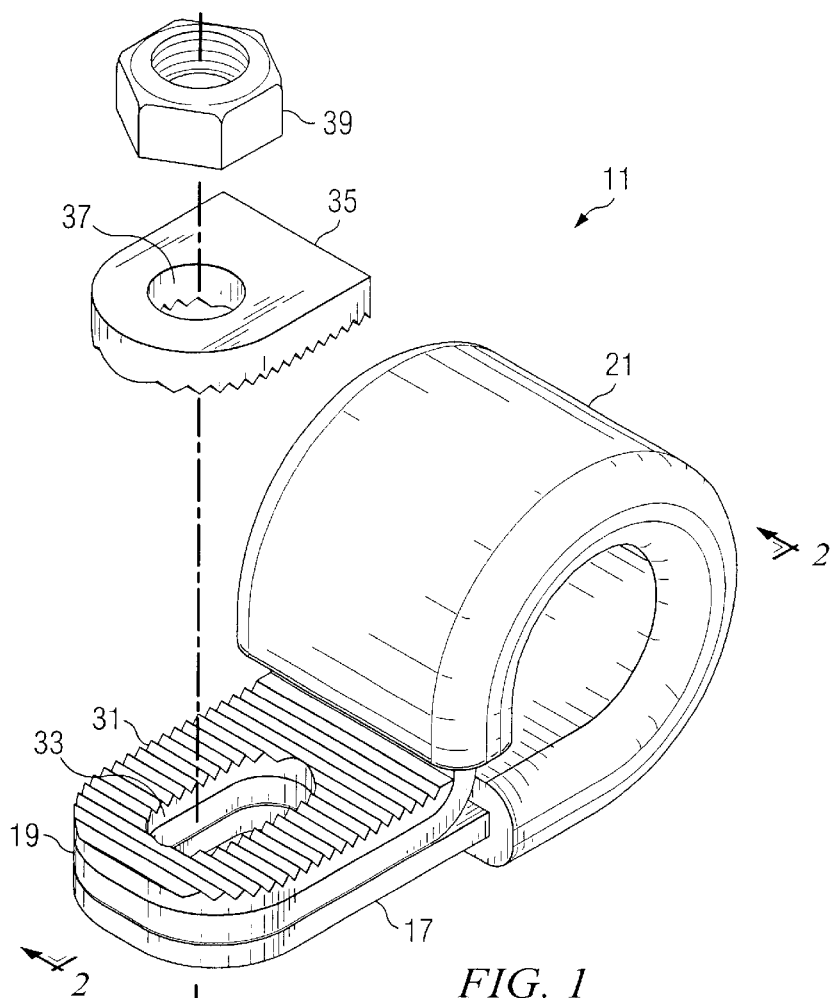
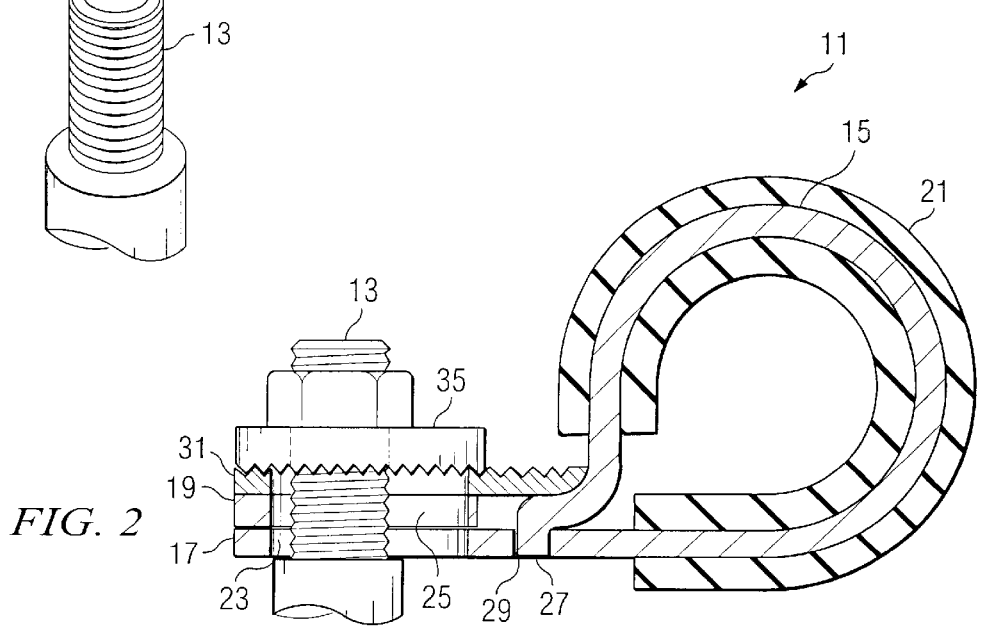

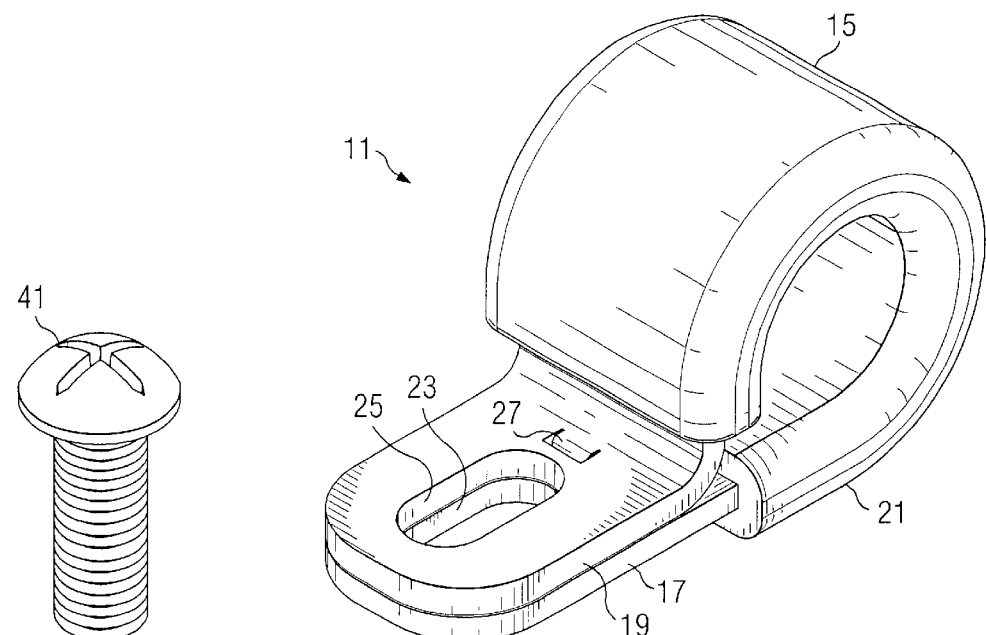
FIG. 4
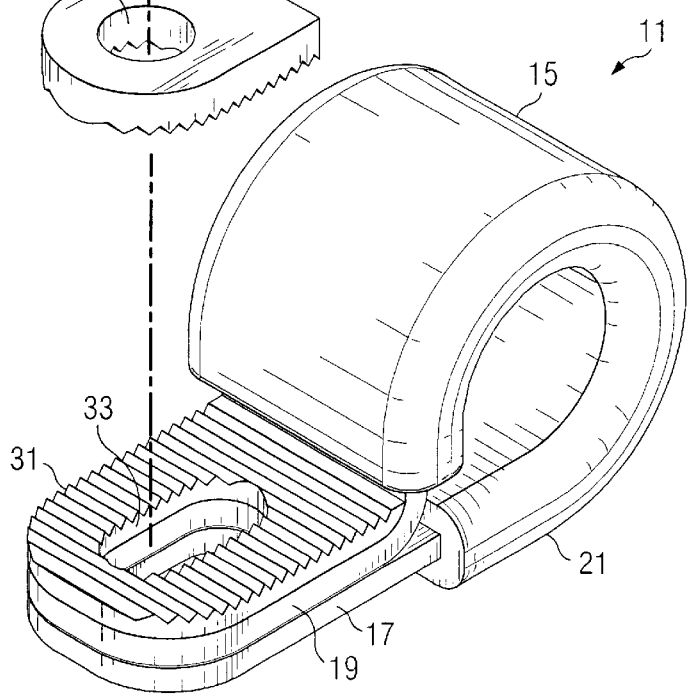
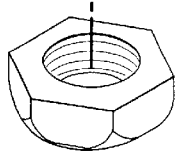
FIG. 3

LATERALLY ADJUSTABLE CLAMP

GOVERNMENT RIGHTS STATEMENT

This invention was made with Government support under Contract No. N00019-93-C-0006 awarded by the Department of the Navy. The Government has certain rights in this invention.

FIELD OF THE INVENTION

The present invention relates generally to the field of clamps, and more particularly to a laterally adjustable P-type clamp.

BACKGROUND OF THE INVENTION

One common way to secure conduits such as hoses, pipes, hydraulic lines, electrical cables and the like to structures is by means of P-clamps. A P-Clamp generally comprises a circular clamp body and a pair of opposable legs connected to the clamp body. The opposable legs usually have therein circular holes that are engageable with a fastener such as a bolt or screw or a stud. In operation, the clamp body is clamped around the article to be secured and the P-clamp is secured to the structure by engaging the hole in the legs with a fastener secured to the structure.

One way in which P-clamps are secured to structures is by means of click studs. A click stud includes a threaded member connected to a plate. The plate is bonded to the structure. A problem with click studs is that they should be positioned relatively precisely with respect to the article being secured. If the click stud is not positioned within a relatively narrow tolerance, the conduit such as a hydraulic line to which the P-clamp is secured can exert a rather substantial side load on the click stud. The side load can cause the click stud to become disbanded from the structure. The disbanding problem can be particularly acute in high vibration environments.

SUMMARY OF THE INVENTION

The present invention provides a clamp that is laterally positionable with respect to a fastener. The clamp of the present invention includes a clamp body including a pair of opposable legs. Each of the legs includes an elongated hole adapted to movably engage the fastener. One of the legs includes a locking surface. A locking washer is engageable with the locking surface of the clamp body leg. The locking washer includes a hole that is adapted to fixedly engage the fastener. When engaged with the fastener, the locking washer fixes the position of the clamp body with respect to the fastener.

BRIEF DESCRIPTION OF THE DRAWINGS

FIG. 1 is an exploded view of a clamp according to the present invention.

FIG. 2 is a sectional view taken along line 2—2 of FIG. 1.

FIG. 3 is an exploded view of an alternative clamping system according to the present invention.

FIG. 4 is a perspective view a portion of a clamp according to the present invention without a serrated top plate and serrated washer.

DESCRIPTION OF THE PREFERRED EMBODIMENT

Referring now to the drawings, and first to FIGS. 1 and 2, a clamp according to the present invention is designated generally by the numeral 11. Clamp 11 is adapted to attach a conduit such as a hydraulic line, electric cable or the like (not shown) to a stud 13.

Clamp 11 includes a generally circular clamp body 15 and a pair of opposable legs 17 and 19. Clamp body 15 is preferably covered with an elastomeric sheath 21.

Legs 17 and 19 each have an elongated hole 23 and 25, respectively, therein. The widths of holes 23 and 25 are substantially equal to the diameter of stud 13. The lengths of holes 23 and 25 are longer than the diameter of stud 13. Accordingly, clamp 11 may be moved laterally back and forth with respect to stud 13. Leg 19 may include a tab 27 that is engagable with a slot 29 in leg 17. Engagement of tab 27 with slot 29 locks together legs 17 and 19 to prevent them from moving laterally with respect to each other.

Leg 19 has affixed thereto a serrated locking plate 31. Plate 31 has therein an elongated hole 33, having substantially the same dimensions as holes 23 and 25 and legs 17 and 19, respectively. Hole 33 of plate 31 is aligned with hole 25 in leg 19.

A serrated locking washer 35 is engagable with serrated plate 31. Washer 35 has a plurality of serrations that are mateable with the serrations of plate 33. Washer 35 also has a round hole 37 therein. The diameter of hole 37 is substantially the same as the diameter of the threaded portion of stud 13. Accordingly, serrated washer 35 is laterally immoveable with respect to stud 13.

In operation, clamp body 15 is clamped around an article such as an hydraulic line to be secured to stud 13. After clamp body 15 is clamped around the article, legs 17 and 19 are brought generally into engagement with each other with tab 27 engaging slot 29. Then, legs 17 and 19 are engaged with the threaded portion of stud 13 with the threaded portion extending through elongated holes 23, 25 and 33. Since holes 23, 25 and 33 are elongated, clamp 11 is positioned laterally with respect to stud 13 such that no preload is applied to the article clamped in clamp body 15. Then, serrated washer 35 is slipped over the threaded portion of stud 13 and into engagement with serrated plate 31. When a nut 39 is made up with stud 13, clamp 11 becomes locked laterally with respect to stud 13. Thus, clamp 11 clamps an article such as a hydraulic line with respect to a stud 13 without exerting lateral force on the clamped article. The clamp according to the present invention allows for reduced tolerances with respect to the placement of studs 13 and clamped articles.

As illustrated in FIG. 3, clamp 11 may also be used with a bolt or screw 41 instead of a stud 13. The bolt 41 may be attached to a structure or bracket (not shown) with a nut or nut plate. In FIG. 4, there is illustrated a clamp 11 without serrated plate 31. Serrated plate 31 is affixed to leg 19 in any of several well known methods for affixing metal articles to each other. In an alternative embodiment, an upper surface of leg 19 may be serrated to eliminate a separate serrated plate 31.

The present invention has been illustrated and described with respect to presently preferred embodiments. Those skilled in the art will recognize alternative embodiments given the benefit of the foregoing disclosure. Accordingly, the foregoing is intended for purposes of illustration rather than limitation.

What is claimed is:

1. A clamp, which comprises:

a clamp body including a pair of opposable legs, one of said legs including a locking plate, each of said legs and said locking plate including an elongated hole adapted to movably engage a fastener, said elongated hole having a length and a width, said locking plate including a plurality of locking members spaced apart along the length of said elongated hole; and, a locking washer lockingly engageable with said locking plate, said locking washer having a hole adapted to fixedly engage said fastener, said locking washer including at least one locking member matingly engageable with locking members of said locking plate, thereby locking said clamp body to said fastener at one of a plurality of fixed positions along said elongated hole.

2. The clamp as claimed in claim 1, wherein said locking plate is affixed to said one of said legs.

3. The clamp as claimed in claim 1, wherein said hole of said locking washer is substantially circular.

4. The clamp as claimed in claim 3, wherein said width of said elongated hole is substantially equal to the diameter of said hole of said locking washer.

5. The clamp as claimed in claim 1, including a clamp cushion affixed to a portion of said clamp body.

6. The clamp as claimed in claim 5, wherein said clamp cushion is elastomeric.

7. The clamp as claimed in claim 1, including means for locking together said legs.

8. The clamp as claimed in claim 7, wherein said means for locking together said legs comprises a tab on one of said legs engageable with a hole on the other of said legs.

9. The clamp as claimed in claim 1, wherein said locking members of said locking plate are defined by a serrated surface.

10. The clamp as claimed in claim 9, wherein said locking washer includes a serrated surface engageable with the serrated surface of the locking plate.

11. A clamp, which comprises:

a clamp body including a pair of opposable legs, each of said legs including an elongated hole having a length and a width adapted to movably engage a fastener along said length of said elongated hole, one of said legs including a locking surface including a plurality of locking members extending along said length of said elongated hole; and, a locking washer including a locking member engageable with said at least one of said locking members of said locking surface of said one of said legs of said clamp body, said locking washer having a hole adapted to fixedly engage a said fastener, thereby locking said clamp body to said fastener at one of a plurality of fixed position along said elongated hole.

12. The clamp as claimed in claim 11, wherein said hole of said locking washer is substantially circular.

13. The clamp as claimed in claim 12, wherein said elongated holes of said legs have a length and a width, said width being substantially equal to the diameter of said hole of said locking washer.

14. The clamp as claimed in claim 11, including a clamp cushion affixed to a portion of said clamp body.

15. The clamp as claimed in claim 14, wherein said clamp cushion is elastomeric.

16. The clamp as claimed in claim 11, including means for locking together said legs.

17. The clamp as claimed in claim 16, wherein said means for locking together said legs comprises a tab on one of said legs engageable with a hole on the other of said legs.

18. The clamp as claimed in claim 11, where said locking surface is defined by a locking plate affixed to said one of said legs.

19. The clamp as claimed in claim 11, wherein said locking members of said locking surface are defined by a serrated surface and said locking member of said locking washer is defined by a serrated surface engageable with said serrated surface of said locking surface.

20. A clamping system, which comprises:

a fastener;

a clamp body, said clamp body including a pair of opposable legs, each of said legs including an elongated hole having a length and a width, said legs being adapted to movably engage said fastener along the length of said elongated hole, one of said legs including a locking surface including a plurality of laterally spaced apart locking members extending along the length of said elongated hole; and, a locking washer including at least one locking member engageable with said at least one of said locking members of said locking surface, said locking washer having a hole adapted to fixedly engage said fastener, thereby fixing said clamp body laterally at one of a plurality of fixed positions with respect to said fastener.

21. The clamping system as claimed in claim 20, wherein said fastener includes a bolt.

22. The clamping system as claimed in claim 20, wherein said fastener includes a stud.

23. The clamping system as claimed in claim 20, wherein said fastener includes a substantially circular portion and said hole of said locking washer is substantially circular having a diameter substantially equal to the diameter of the circular portion of said fastener.

24. The clamping system as claimed in claim 23, wherein said elongated holes of said legs have a length and a width, said width being substantially equal to the diameter of said hole of said locking washer.

25. The clamping system as claimed in claims 20, including a clamp cushion affixed to a portion of said clamp body.

26. The clamping system as claimed in claim 25, wherein said clamp cushion is elastomeric.

27. The clamping system as claimed in claim 20, including means for locking together said legs.

28. The clamping system as claimed in claim 27, wherein said means for locking together said legs comprises a tab on one of said legs engageable with a hole on the other of said legs.

29. The clamping system as claimed in claim 20, wherein said locking surface is defined by a locking plate affixed to said one of said legs.

30. The clamping surface as claimed in claim 20, wherein said locking members of said locking surface include a plurality of serrations on said locking surface and said locking member of said locking washer includes at least one serration engageable with a serration of said locking surface.

* * * * *